Dec. 7, 1971  E. H. NATSCHKE  3,625,086

SEALED NON-SPIN HAND BRAKE ARRANGEMENT

Filed Oct. 27, 1969  4 Sheets-Sheet 1

INVENTOR
ELDRED H. NATSCHKE

BY
Mann, Brown, McWilliams & Bradway
ATTORNEYS

Dec. 7, 1971  E. H. NATSCHKE  3,625,086
SEALED NON-SPIN HAND BRAKE ARRANGEMENT
Filed Oct. 27, 1969  4 Sheets-Sheet 4

INVENTOR
ELDRED H. NATSCHKE

BY
Mann, Brown, McWilliams & Bradway
ATTORNEYS

United States Patent Office 3,625,086
Patented Dec. 7, 1971

3,625,086
SEALED NON-SPIN HAND BRAKE ARRANGEMENT
Eldred H. Natschke, Bourbonnais, Ill., assignor to Universal Railway Devices Company
Filed Oct. 27, 1969, Ser. No. 869,534
Int. Cl. F15d 63/00
U.S. Cl. 74—505
6 Claims

ABSTRACT OF THE DISCLOSURE

A hand brake of the non-spin type for railroad cars including a front casing and rear attachment plate that define a housing space for the brake operating shaft, ratchet wheel, ratchet wheel clutch, brake release mechanism, and drum gear, that is sealed from the elements by a seal applied between the two. The front casing is intended to define a mounting space for the brake drum, which may be of either the single or double chain wind type and is keyed to a mounting shaft that is journaled between the casing and a brake drum cover plate that is removably secured to the casing. The drum shaft extends into the housing space where it has fixed to same the drum gear. The brake drum and shaft cooperate with bearings that journal the brake drum shaft to keep the brake drum centered in its mounting space and the drum gear spaced from the rear attachment plate.

---

My invention relates to a hand brake of the non-spin type for railroad cars, and more specifically to improvements in the hand brake shown in Patents Nos. 2,416,251, 2,848,083, 3,390,590 and 3,444,756.

Hand brakes for railroad cars as part of their operational environment are fully exposed elements which means that fouling due to moisture and dirt is a common occurrence. This is particularly true of hand brakes arranged for under the car application where they are exposed to the debris of dust, must, snow, and the like that is made air-borne by movement of the car and its wheels.

Nevertheless, the sealing off of vital parts of the hand brake from exposure to the elements is made difficult by the fact that the hand brake chain must be able to move freely from its drum on full release, and the operating and release shafts of the brake need to be controlled exteriorly of the brake housing to provide the simplified mechanical control over their functions that railroad car hand brakes require.

A principal object of this invention is to provide a sealed hand brake arrangement of the non-spin type that is readily applicable to hand brake designs of the under the car application as well as those designs for mounting at the sides or ends of the car above the floor level, and does not interfere with the desired mechanical control over the hand brake vital functions.

Another principal object of the invention is to provide a mounting arrangement for the drum of the hand brake that permits ready running on and running off of the brake chain while providing for the sealing off of the other critical parts of the brake.

Other objects of the invention are to provide a sealed hand brake arrangement of the non-spin type that is economical of manufacture, convenient to install and operate, and long lived in operation.

Further objects, uses, and advantages will be obvious or become apparent from a consideration of the following detailed description and the application drawings, in which like reference numerals indicate like parts throughout the several views.

However, it is to be understood that the specific drawing illustrations provided are supplied primarily to comply with the requirements of the patent code, and that the invention may have other specific embodiments that will be obvious to those skilled in the art.

Figure 1:
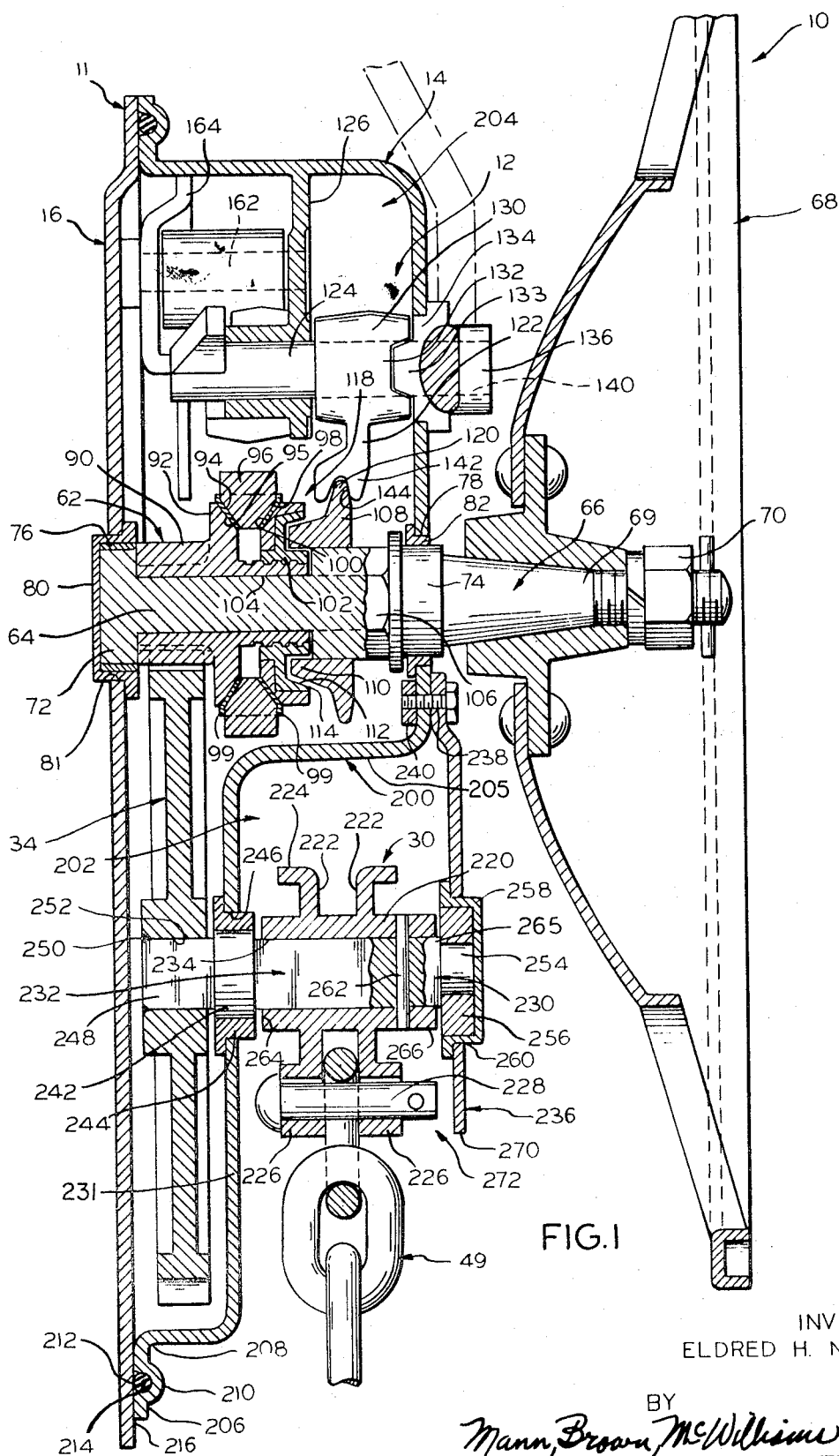
FIG. 1 is a vertical sectional view of a vertical hand wheel type hand brake in which the improvements of my invention have been embodied, with some parts shown in elevation, and with the brake shown with the chain unwound and in condition for winding the chain on the brake drum.
Figure 2:
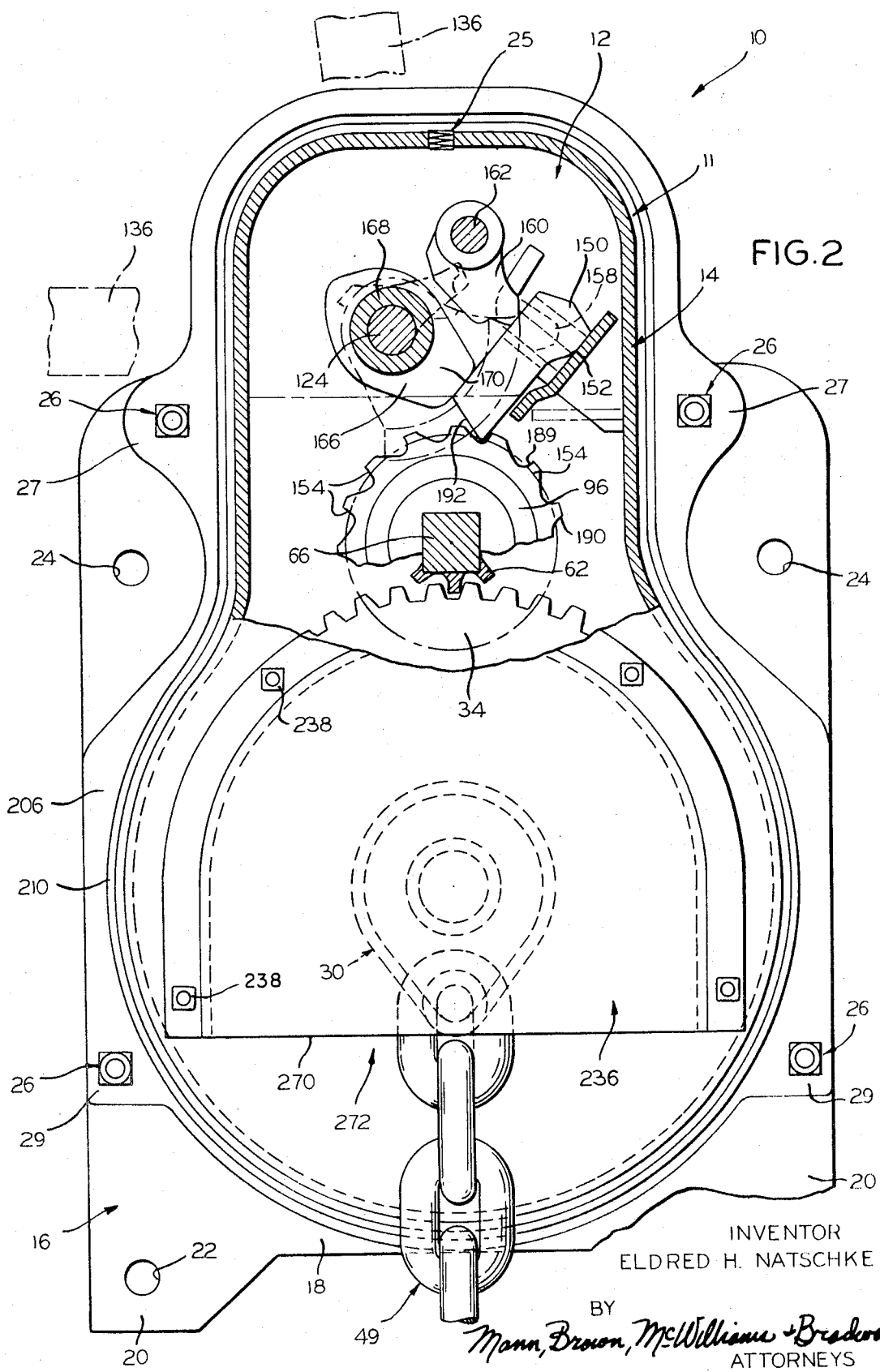
FIG. 2 is a front elevational view of the hand brake shown in FIG. 1, with parts broken away to expose other parts, and with the hand brake release handle being partially shown in its two operating positions in broken line.

Reference numeral 10 of FIGS. 1 and 2 indicates one embodiment of the invention in the form of a vertical hand wheel hand brake positioned as it would be applied to a railroad car, in which the brake operating mechanism is indicated at 12 and is contained in a housing 11. While reference may be had to Natschke and Macku Patent 3,390,590 for the specifies of a hand brake operating mechanism of the type illustrated, the hand brake details will be described to some extent herein to insure a complete understanding of the structural features involved.

The housing is in two sections comprising a front casing 14 and a back section or attaching plate 16 defining a body portion 18 formed with a pair of lower attaching lugs 20 each which is formed with a bolt hole 22. The attaching plate 16 is also formed with upper bolt holes 24, and bolt holes 22 and 24 are adapted to receive appropriate attachment bolts or the like to secure the back plate or section to the car in a conventional manner.

The front casing 14 includes a suitable oil cap indicated at 25 in FIG. 2 and is secured to the back section or attaching plate by appropriate bolts indicated at 26 that respectively pass through suitable upper lugs 27 and lower lugs 29 of the front casing. The major portion of the brake operating mechanism is mounted within this casing and in such a manner as to be removable with it.

The brake operating mechanism 12 includes brake drum 30 to which the brake chain 49 is attached, a drum gear 34 that meshes with a pinion 62 journaled on a reduced portion 64 of operating shaft 66 to which the hand wheel 68 is suitably keyed. In the form shown, the operating shaft 66 is formed with an outwardly extending tapered portion 69 of square cross-sectional configuration (see FIG. 2) on which the hand wheel 68 is received and against which the hand wheel is clamped by appropriate nut 70 or other suitable restraining means.

The operating shaft 66 includes the enlarged portions 72 and 74 (FIG. 1) which are respectively journaled in a brass bushing 76 and a Phosphor bronze bushing 78 received in the housing casing and back plate, respectively. The brass bushing sleeve 76 is received in a dished bearing retainer 80 that is received in opening 81 of the attaching plate 16, while bushing 78 is applied directly to an opening 82 of housing section 14 by being pressed directly into same.

As indicated in FIG. 1, the pinion 62 comprises a gear portion 90 and a clutch collar portion 92 formed with a conical friction face 94 that is intended to cooperate with a similarly formed friction face 95 of ratchet wheel 96. The other side of the ratchet wheel 96 is formed with a similar friction face 98 that is intended to cooperate with friction face 100 of nut 102 that is threadedly mounted on a threaded portion 104 of pinion 62. In the form illustrated, friction surfaces 94 and 95, and 98 and 100, are separated by annular brass cone members 99 that complement the respective surfaces they are between and are free to float with respect thereto.

Operating shaft 66 is formed with a hex shaped portion 106 on which is slidably mounted a jaw clutch sleeve 108 provided with jaws 110 that are proportioned and spaced to fit into recesses 112 formed in the face 114 of nut 102 which define cooperating teeth of the nut that complete the tooth or jaw clutch between the operating shaft 66 and the nut that is generally indicated at 118.

The clutch sleeve 108 is provided with a radial flange 120 which is engaged by a grooved cam member 122 keyed to release handle shaft 124 that is journaled between the casing and a bracket plate 126 which is suitably mounted therein. Cam member 122 includes a hub portion 130 that is received over the shaft 124 and is formed with spaced indentations 132 that receive the similarly spaced projections 133 of the hub portion 134 of release handle 136 that is affixed to shaft 124 in any suitable manner. In the form shown, the tapered portion of shaft 124 that is indicated at 140 is given a polygonal keying configuration to conform with a similar polygonal keying configuration of the handle hub portion 134 for keying the handle to the shaft 124. These parts are fixed against separation in any suitable manner, such as by welding.

The cam member 122 is formed with a rim portion 142 defining a camming groove 144 in which the radial flange 120 of the clutch sleeve 108 is mounted. The camming groove 144 is given the configuration that will move the teeth 110 of clutch sleeve 108 from recesses 112 of nut 102 as release handle 136 is moved from the lower broken line position of FIG. 2 to the upper line position of that figure (the latter is the full brake release position).

Also controlled by the release handle 136 is a pawl 150 (see FIG. 2) that is slidably mounted on support plate 152 affixed to the bracket plate 126 in any suitable manner, which pawl 150 engages in the teeth 154 of ratchet wheel 96. Pawl 150 is provided with an opening in which is received the end 158 of operating arm or finger 160 that is journaled by a headed pin 162 between the plate 126 and the supplemental bracket plate 164 mounted within the front casing 14.

Also mounted on the release handle shaft 124 is a holding pawl stop member 166 which is in the form of a sleeve portion 168 and a pawl engaging arm 170. The sleeve 168 is rotatably mounted on the release shaft 124 and is provided with a pair of spaced apart shoulders that are about 180 degrees apart that are not shown in the drawings but are clearly illustrated in said Patent 3,390,590; as described in said Patent 3,390,590, one of these shoulders is engaged by a shoulder of the shaft 124 to hold the pawl engaging stop member 166 in engagement with the pawl 150 in the brake holding position of the shaft 124 when the release handle 136 is in its brake holding position. The shaft 124 is also formed with a shoulder positioned to engage the other shoulder of sleeve 168 to move the pawl engaging stop member 166 out of engagement with the pawl 150 as the release handle is moved to the upper position of FIG. 2.

As indicated, the brake release mechanism shown is essentially the same as that described in said Patent No. 3,390,590. The parts associated with pawl 150 are so constructed that when the release handle 136 is in the lower position of FIG. 2, one of the aforementioned shoulders of release shaft 124 (shown at 178 in said Natschke and Macku patent) will engage a corresponding shoulder (shown at 172 in said Natschke and Macku patent) of the sleeve 168 thereby holding the pawl stop arm 170 in the position shown in FIG. 2 against the pawl, which will thus be held against partial rotation. In such position, the ratchet wheel 96 is held from rotating in the direction that will release the brake (that is, a counterclockwise direction in the showing of FIG. 2). But when the ratchet wheel is moved through the hand wheel 68 and the intervening clutch device in a clockwise direction, the inclined surfaces 190 of the ratchet wheel teeth 154 will engage the upwardly inclined surface 193 of a pawl 150, thereby causing the pawl to slide upwardly lengthwise of its axis until the tooth is past the pawl, whereupon the pawl will drop by gravity into the space between the next adjacent teeth for abutting engagement with the next toothed surface 189.

In the specific hand brake arrangement that is shown in FIGS. 1 and 2, the front casing 14 is indented inwardly as at 200 (see FIG. 1) to define an operating space 202 exteriorly thereof that is substantially within the plane of the front casing, in which the brake drum 30 is mounted for purposes of disposing the brake drum 30 and its chain 49 exteriorly of the space 204 that is enclosed by front casing 14 and the rear mounting plate 16. Casing 14 thus defines a shoulder 205 at one side of operating space 202.

For purposes of sealing off such space 204 and the mechanisms enclosed therein from the elements, the front casing 14 is flanged as at 206 about its rim 208, which flange portion is shaped to define lugs 27 and 29 and is indented as at 210 to define a recess 212 which is in circumambient relation about the front casing 14. Mounted within the groove 212 is a seal element 214 of any suitable type, as for example a length of O-ring type material cut to fit within the groove 212 and fill same with the ends thereof abutted. The seal element 214 is proportioned so that when the casing 14 is applied against the surface 216 of the back section 16, the seal engages both the front casing and mounting plate, whereby when the front casing 14 is affixed to the mounted plate by bolts 26, the seal element 214 will be clamped into firm sealing engagement with both the casing and the mounting plate.

While the seal element 214 may be made in the form of an endless element exactly proportioned to fit into the groove 214, for reasons of economy I prefer that the sealing element may be cut to the desired length from a bulk supply of such material in strand form. If desired, the cut ends instead of merely being in abutting relation can be spliced together or otherwise overlapped to insure a complete seal all the way about the rim of the casing 14.

Brake drum 30 in the form illustrated is of the single wind type and comprises a hub member 220 defining spaced ribs 222 which are flanged as at 224 to define a seat for alternate chain links. The ribs 222 each have affixed thereto a sleeve 226, which sleeves 226 receive the pin 228 that secures the brake chain 49 to the brake drum.

The brake drum 30 is secured in its operating space 202 by being mounted on brake drum shaft 230, which includes a hub carrying portion 232 of polygonal configuration on which the brake drum hub portion 220 fits, the hub portion 220 defining a bore 234 that is proportioned substantially complement the configuration of the shaft portion 232.

The brake drum shaft 230 is journaled between the indented portion wall 231 of the front casing 14 and a brake drum cover plate 236 that is secured to the casing 14 over the brake drum as by employing suitable bolts 238 cooperating with nuts 240 that are fixed in place, as by welding, to the inner surface of casing 14 in the positions indicated in FIG. 2.

The brake drum shaft 230 includes an enlarged portion 242 which is journaled in Phosphorus bronze bushing 244 that is pressed into the opening 246 formed in the casing 14 for this purpose.

Shaft 230 includes an extension 248 to which the drum gear 34 is affixed in any suitable manner, as by welding at 250. Extension 248 may be polygonal configuration designed to be complementarily received within a corresponding polygonal bore 252 formed in the gear 34.

At the other end of the shaft 230, extension 254 is journaled in a brass bushing 256 received in a cup 258 that is in turn received in opening 260 formed in drum cover plate 236 for this purpose.

The drum hub portion 220 is keyed against movement longitudinally of shaft 230 by suitable shear pin 262. The drum hub portion 220 is proportioned longitudinally of shaft portion 232 so that its ends 264 and 266 substantially overlie such portion 232 of shaft 230. Shaft extension 254 engaging the cup 258 prevents movement of the drum shaft 230 to the right of FIG. 1, while the end 264 of the drum hub 220 will engage the bearing 244 to prevent more than a predetermined amount of movement of the gear 34 in the direction of mounting plate 16, which predetermined amount of movement should not be enough to permit the gear 34 or shaft 230 to engage such plate 16. In the event that shaft extension 254 does not engage the cup 258, the shoulder 265 of the shaft 230, or end 266 of the hub portion 228, will serve the same purpose by engaging the bearing 256 (depending on how closely drum hub 220 is proportioned to cover shaft portion 232).

With the braked rum and its shaft arranged and journaled as indicated, the drum gear 34 can be mounted completely within the sealed off space 204 of the housing 11 while the brake drum 30 itself is disposed exteriorly of the casing 14 to permit the brake chain 49 to be readily wound up on the drum, or to run off from same, on release of the brake.

Figure 4:
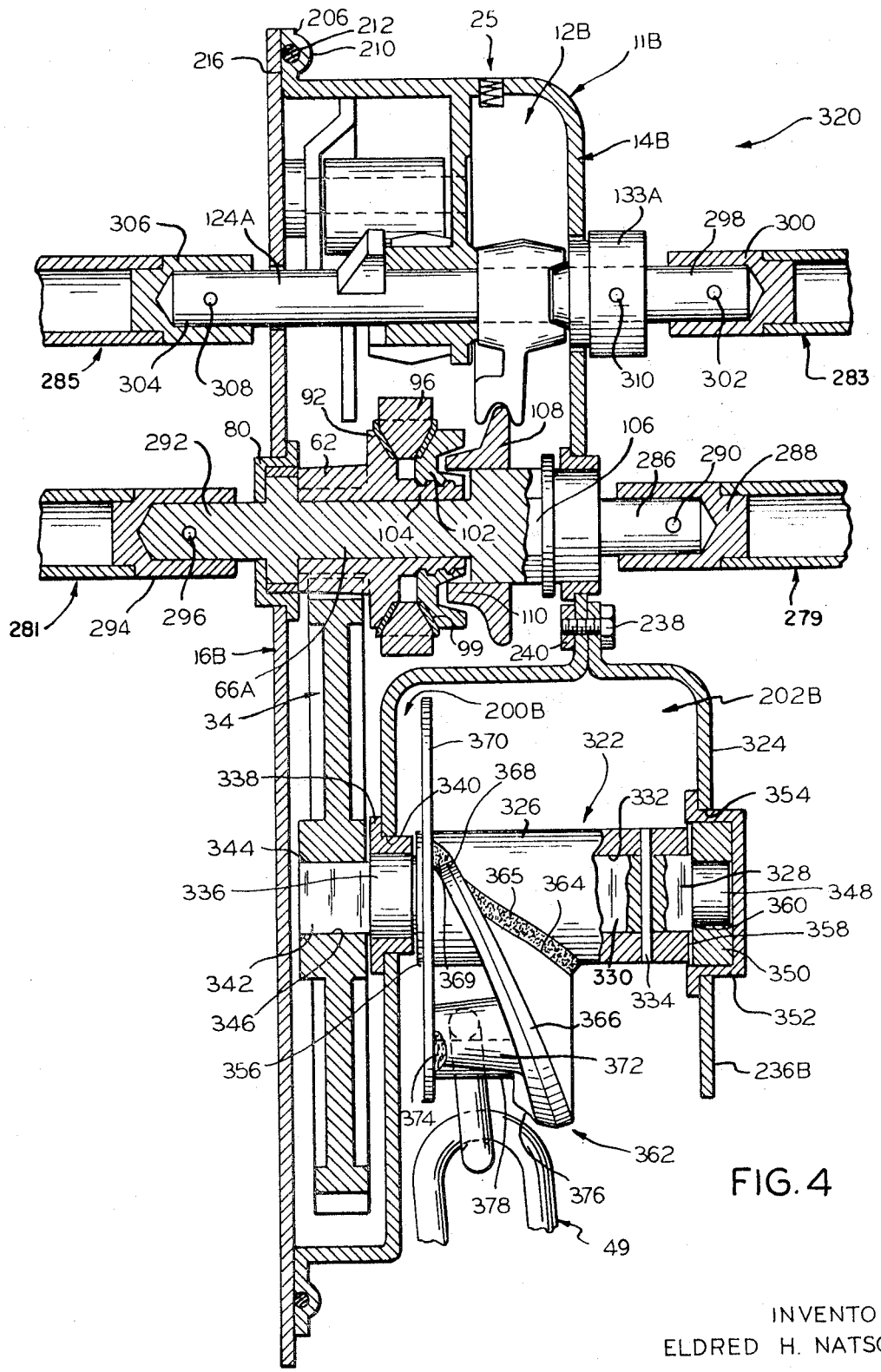
FIG. 4 is a view similar to that of FIG. 3 showing the hand brake as modified for double brake chain wind for increased chain travel.

Drum cover 236 is dished in a manner similar to the upper portion of casing 14 to enclose the operating space 202 except in the area of operation of the brake chain 49 where the edge portion 270 of the drum cover 236 and the indented portion of the casing 14 define an opening 272 in which the brake chain operates. Where double chain wind is desired, the cover is formed to increase the operating space 202 to the right of FIG. 1, and the drum arrangement of FIG. 4 is employed, operating shaft 66 being lengthened to the right as may be necessary to avoid interference between hand wheel 68 and the modified drum cover.

In operation, assuming that the hand brake 10 is released, the normal inoperative position of the release handle 136 will be positioned in the lower position of FIG. 2, which brings the teeth of clutch sleeve 108 into engagement with the teeth receiving recesses 112 of nut 102 and biases pawl 150 toward the ratchet wheel 96. Rotation of the hand wheel 68 in the direction to wind up the brake (clockwise of FIG. 2) will turn nut 102 towards clutch collar 92 of pinion 62 and bind the ratchet wheel 96, the pinion 62, and the operating shaft 66 into one rotating unit which will rotate the drum 30 in the direction to wind up the brake. During this operation, the pawl 150 moves back and forth under the action of teeth 144 and gravity until the brake is set. The release handle 136 remains in the lower position so that when the brake is wound up and the pawl is returned to its full lined position of FIG. 2, the brake is fully set.

If it is desired to gradually release the brake, handle 68 is rotated in a counterclockwise direction a slight amount, which will have the effect of loosening nut 102 and thus the clutching surfaces between the ratchet wheel 68 and pinion 62 so that the pinion 62, shaft 66, and hand wheel 68 will rotate with respect to the ratchet wheel under the control of the operator, who by slight loosening or tightening movements can increase or decrease the friction drag on the rotational movement on the pinion 62, thus fully controlling brake release.

When it is desired to provide a free release of the brakes, the release handle 136 is moved from the lower position of FIG. 2 to the upper position of FIG. 2, which withdraws the teeth 110 of jaw clutch 118 from recesses 112 of nut 102 and moves pawl engaging arm 170 out of contact with the pawl so that the ratchet wheel pinion 62 and drum 30 freely rotate to release the brakes. As soon as the handle 136 is released, it automatically returns returns by gravity to its lower position of FIG. 2 since it cannot be raised beyond a vertical position. It is preferred that the amount of movement between the horizontal position of FIG. 2 and the upper position of the same figure be on the order of 84 degrees, and a suitable stop pin of the type described in said Natschke and Macku patent (shown at 195 in that patent) in the path of movement of the cam member 122 provides for the release position of handle 136.

Figure 3:
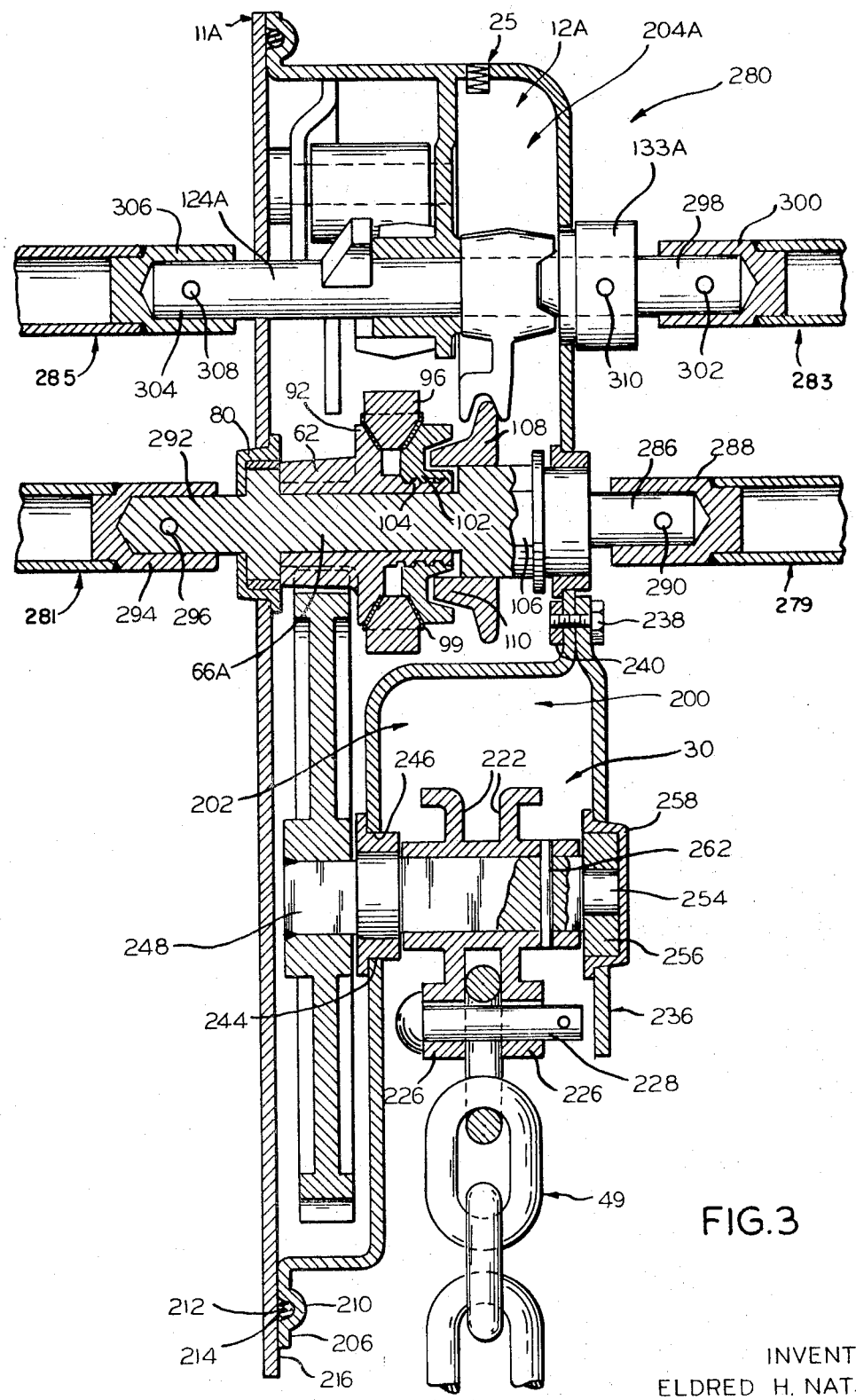
FIG. 3 is a view similar to that of FIG. 1 illustrating the improvements of my invention applied to a hand brake of the under the car application type arranged for single brake chain wind.

Referring now to the embodiment of FIG. 3, the hand brake 280 there illustrated comprises a housing 11A and brake operating mechanism 12A that are substantially identical to the housing 11 and brake operating mechanism 12 of the embodiment of FIGS. 1 and 2 (including its brake drum 30 and associated parts), as indicated by identical reference numerals indicating identical parts.

However, the brake 280 is arranged for an under the car application in the manner disclosed by Andonian Patent 3,444,756, in accordance with which the housing 11A is turned on its side and secured to the car underframe intermediate the sides of the car and between a pair of mounting plates (not shown but shown at 246 and 272 in said Andonian patent) that are respectively secured to the car sides, with the housing 11A extending longitudinally of the car. Journaled in the respective mounting plates are extensions for the hand brake operating and release shafts 66 and 124 that are each provided with operating handles exteriorly of the mounting plates and positioned relative to the car wheels so that the hand brake may be readily operated from either side of the car by the brakeman standing at ground level. The hand brake parts are oriented so that gravity aids the holding of the hand brake mechanism against release.

The sealing boot for the chain called for by the Andonian patent is not necessary in the arrangement of FIG. 3 by reason of the mounting of the brake drum 30 thereof in the manner indicated, that is, exteriorly of the sealed space 204A of the housing 11A.

As specifically illustrated in FIG. 3, the extensions for the hand brake operating and release shafts are in the form of shafts 279 and 281 that correspond to shafts 17 and 19 that are described in said Andonian patent, while the extensions for the release shaft comprise shafts 283 and 385 that correspond to shafts 25 and 27 that are shown in said Andonian patent.

In the case of the operating shaft 66A, in the embodiment of FIG. 3 it is provided at one of its ends with an extension 286 that is keyed to a coupling member 288 by a suitable pin 290, which coupling member 288 is secured to shaft 279 as by welding.

At its other end, the shaft 66A includes extension 292 which extends through the cup 80 and receives coupling member 294 to which it is keyed by a suitable pin 296. Shaft 281 is affixed to coupling member 294 as by welding.

In the case of the release shaft 124A, the release handle 136 is eliminated, and in its place the release shaft 124A is extended as at 298 for reception in a coupling member 300 to which it is keyed by suitable pin 302. Coupling member 300 is fixed to shaft 283 as by welding.

At its other end, release shaft 124A is extended as at 304 for reception in coupling member 306 to which it is keyed by a suitable pin 308. Coupling member 306 is fixed to shaft 285 as by welding.

The hub handle 133 of release member 136 is replaced by a corresponding hub member 133A that is affixed to shaft 124A in any suitable manner, as by employing suitable pin 310.

The hand brake 280 operates in the manner similar to hand brake 10 except that the hand wheel 21 and 23 and handles 29 and 31 described in said Andonian patent are manipulated to control the hand brake.

In the embodiment 320 of FIG. 4, the housing 11B and brake operating mechanism 12B are similar to the corresponding housing 11A and operating mechanism 12A of FIG. 3, with the brake drum 322 and operating space 202B being arranged for double chain wind for increased brake chain take up.

In this embodiment of the invention, the drum cover 236B has its wall 324 displaced to the right sufficiently to accommodate a double chain wind, and drum 322 comprises a hub member 326 received on brake drum shaft 328 that is similar to shaft 230 but longer to accommodate the increased dimension of operating space 202B. Thus, shaft 328 includes hub carrying portion 330 of polygonal configuration on which the brake drum hub member fits, the hub member defining a bore 332 that is proportioned to substantially complement the configuration of shaft portion 330 and being keyed against movement longitudinally of shaft 328 by pin 334.

The brake drum shaft 328 is journaled between the indented portion 200B of the front casing 14B and brake drum cover plate 236B that is secured to the casing 14B over the brake drum as by employing suitable bolts 238 cooperating with nuts 240 that are fixed in place, as by welding, to the inner surface of casing 14 in the same manner as indicated in FIG. 2.

The brake drum shaft 328 includes an enlarged portion 336 which is journaled in phosphorus bronze bushing 338 in the form of a flanged sleeve that is pressed into the opening 340 formed in the casing 14B for this purpose, as in the embodiments of FIGS. 1–3.

Shaft 328 includes extension 342 to which the drum gear 34 is affixed, as by welding at 344. Extension 342 may be of polygonal configuration designed to be complementarily received within a corresponding polygonal bore 346 formed in the gear 34.

At the other end of the shaft 328, extension 348 is journaled in a brass bushing 350 received in a cup 352 that is in turn received in opening 354 formed in drum cover plate 236B for this purpose.

The drum hub portion 326 is proportioned longitudinally of shaft portion 328 so that its ends 356 and 358 substantially overlie such portion 328. Shaft extension 348 engaging the cup 352 prevents movement of the drum shaft 328 to the right of FIG. 4, while the end 256 of the drum hub 326 will engage the bearing 338 to prevent more than a predetermined amount of movement of the gear 34 in the direction of mounting plate 16B, which predetermined amount of movement should not be enough to permit the gear 34 or shaft 328 to engage such plate 16B. As in the embodiments of FIGS. 1–3, in the event that shaft extension 348 does not engage the cup 352, the shoulder 360 of the shaft 328, or end 358 of the hub portion 228, will serve the same purpose by engaging the bearing 350 (depending on how closely drum hub 326 is proportioned to cover shaft portion 232).

Drum member 326 is provided with a chain anchor and guide 362 of the type described in Wilson Patent 2,723,-832, which is in the form of a segment of a spiral vane defining a small arc 364 and a large arc 366. Guide 362 has its edge 368 welded, as at 369, to a hub flange 370 that is also fixed to hub member 326 as by welding; guide 362 is also welded to hub member 326 along arc 364, as at 365 and includes integral brace 372 that is welded to flange 370 as at 374.

Guide 362 is suitably thickened at its edge 376 and formed with an opening aligned with a similar opening in flange 370 to receive the chain fastening pin 378.

The hand brake 320 functions in a manner similar to that of FIG. 3 except that a greater brake chain take up is provided for.

It will therefore be seen that I have provided a sealed hand brake arrangement which permits the vital working parts of the hand brake to be sealed against the elements while yet permitting adequate operating space for the brake chain winding and unwinding operations.

I claim:

1. In a hand brake for railroad cars including a housing adapted to be mounted on a car, an operating shaft journaled in the housing, pinion and ratchet means mounted on the shaft with said pinion and ratchet means comprising a pinion rotatably mounted on the shaft and including a threaded portion, a nut mounted on the pinion threaded portion, and a ratchet wheel rotatably mounted on the shaft between friction clutch faces of the pinion and nut which ratchet wheel includes friction clutch faces on either side thereof adapted for cooperation with the friction clutch faces of the pinion and nut respectively to clutch the ratchet wheel against movement relative to the shaft, a jaw clutch keyed to said operating shaft and mounted for shifting movement axially of said shaft and to clutch and unclutch with respect to said nut and turn same, when clutched thereto, relative to said pinion to provide a controlled release of the brake through clutching and unclutching of said clutch faces, brake holding means including pawl means mounted in said housing and cooperating with said ratchet means for holding said brake against release, hand operated release means for controlling said pawl means and including means for clutching and unclutching said jaw clutch to fully release the brake, a winding drum and cooperating drum gear meshing with said pinion, a brake chain anchored to said drum, and means for rotating said operating shaft to wind the chain up on the brake drum through said pinion and drum gear when said jaw clutch is clutched with said nut and said nut is rotated to clutch said ratchet wheel against rotation relative to said operating shaft, the improvement wherein:

said housing comprises a front casing and back attaching plate secured together by bolt means and journaling said operating shaft therebetween and housing said pinion and ratchet means, said jaw clutch, said brake holding means, and said drum gear, means for sealing the space enclosed by said front casing and said attaching plate including a seal element compressed therebetween, said front casing adjacent said drum being indented inwardly of the housing to define a mounting space for said drum, an inwardly offset casing wall that is in closely spaced relation to said back plate, and an external shoulder in the casing defining one edge of said mounting space, a drum cover plate removably secured to said casing over said space and overlying said casing wall and shoulder, a drum shaft, means for journaling said drum shaft between said casing wall and said drum cover plate, said shaft including one end portion extending into the space between said casing wall and said attaching plate but short of said attaching plate, said drum gear being keyed to said drum shaft one end for rotation therewith, the portion of the drum shaft within said drum mounting space being formed to define a polygonal configuration about the axis thereof, said drum comprising a drum hub having a bore shaped to complement the configuration of said drum shaft portion, and being received on said shaft portion to key same to said drum shaft, shear pin means acting between said drum hub and said drum shaft to fix said hub on said shaft against movement longitudinally thereof within said mounting space, means for maintaining said hub and drum shaft centered within said drum mounting space whereby said drum gear is maintained spaced from said attaching plate, said journalling means for said drum shaft including annular bearing means fixed with respect to said casing wall and cover plate, respectively, said annular bearing means of said cover plate comprising a cup shaped retainer receiving a sleeve shaped bushing, with said retainer including a rim portion thereabout and said retainer being received in said cover plate with said retainer flange abutting the inner surface of said cover plate and the drum shaft other end journalled in said bushing, said annular bearing means of said casing wall comprising a flange bearing sleeve press fitted into said casing wall with the flange thereof abutting the inner side of said casing wall, said maintaining means comprising end portions of said hub being disposed adjacent the respective bearing means and proportioned to maintain said drum gear spaced from said back plate, said seal means further comprising said casing being formed with a laterally extending flange portion about its rim, said casing flange portion being indented away from said attaching plate to define a seal receiving recess in circumambient relation thereabout, said seal element being received in said recess and extending thereabout and proportioned to engage both said casing and said attaching plate, said bolt means in securing said casing and attaching plate together clamping said seal in sealing engagement with said casing and attaching plate.

2. The improvement set forth in claim 1 wherein said brake is formed to be mounted in a vertical position above the floor level of the car.

3. The improvement set forth in claim 1 wherein said brake is formed to be of the under the car application type.

4. The improvement set forth in claim 1 wherein said drum is of the single brake chain wind type.

5. The improvement set forth in claim 1 wherein said drum is of the double brake chain wind type.

6. The improvement set forth in claim 5 wherein said drum comprises:

said drum hub having a hub flange fixed thereto and disposed adjacent the outer side of said casing wall, and a spiral chain anchor and guide fixed to said drum hub and hub flange, and means for anchoring an end of the brake chain between said hub flange and an end portion of said guide.

References Cited

UNITED STATES PATENTS

| | | | |
|---|---|---|---|
| 2,416,251 | 2/1947 | Camp | 74—505 |
| 3,390,590 | 7/1968 | Natschke et al. | 74—505 |
| 3,435,605 | 4/1969 | Rivers | 64—28 |
| 3,444,756 | 5/1969 | Andonian | 74—505 |

MARTIN P. SCHWADRON, Primary Examiner

B. GROSSMAN, Assistant Examiner

U.S. Cl. X.R.

188—197

PO-1050
(5/69)

UNITED STATES PATENT OFFICE
CERTIFICATE OF CORRECTION

Patent No. 3,625,086          Dated December 7, 1971

Inventor(s) Eldred H. Natschke

It is certified that error appears in the above-identified patent and that said Letters Patent are hereby corrected as shown below:

Column 1, line 19, for "intended" read -- indented --;
Column 8, line 10, after "nut" insert a comma (,);
Column 10, line 22, for "3,435,605" read -- 3,435,695 --.

Signed and sealed this 9th day of May 1972.

(SEAL)
Attest:

EDWARD M. FLETCHER, JR.
Attesting Officer

ROBERT GOTTSCHALK
Commissioner of Patents